United States Patent [19]
Joyce

[11] 3,891,868
[45] June 24, 1975

[54] ELECTRICALLY-CONDUCTING MATERIALS

[75] Inventor: Norman George Joyce, Reading, England

[73] Assignee: Science Research Council, London, England

[22] Filed: May 3, 1974

[21] Appl. No.: 466,846

[52] U.S. Cl. ................................ 310/5; 310/6
[51] Int. Cl. ................................... H02n 1/00
[58] Field of Search .............. 161/182; 310/5, 6, 7; 74/230.1, 230.15; 282/511

[56] References Cited
UNITED STATES PATENTS

| 3,256,450 | 6/1966 | Gartner | 310/6 |
| 3,406,126 | 10/1968 | Litant | 252/511 |
| 3,529,185 | 9/1970 | Isoya et al. | 310/6 |
| 3,612,919 | 10/1971 | Herb | 310/6 |
| 3,649,435 | 3/1972 | Uarlas | 161/182 X |

*Primary Examiner*—Donovan F. Duggan
*Attorney, Agent, or Firm*—Larson, Taylor & Hinds

[57] ABSTRACT

In an electrostatic generator of the kind in which electrical charges are carried from an electrostatic charging device to a terminal electrode by an endless belt-like charge conveyor, the pulleys for supporting and driving the conveyor are preferably made electroconductive. The improved electrically conducting pulleys have conveyor-engaging surfaces formed by the edge portions of laminations of electrically conducting fibre cloth, such as carbon fibre cloth disposed in the plane of the pulley and integrated into a coherent, yet yieldable body by a cured plastics or rubber material giving good abrasive and substantially dust-free wearing properties.

9 Claims, 3 Drawing Figures

ELECTRICALLY-CONDUCTING MATERIALS

BACKGROUND OF THE INVENTION

This invention relates to electrically conductive pulleys for electrostatic generators of the kind in which an electrode is charged to a high electrical potential by the transfer of electrical charges there to by means of an endless charge conveyor. In such generators adapted for inductor charging driving and support pulleys are preferably made electrically conducting so that the pulley may be grounded or used as a conductor for transferring charges from the conveyor to the electrode via the pulley shaft rather than by using a separate conductor. One object of the invention is to provide such a pulley which is both electrically conducting and of low resistivity. Pulleys made wholly of metal have been proposed but these are generally very noisy, wear badly and make a considerable amount of dust which is undesirable. A further object of the invention is to provide an electrically conducting pulley for an electrostatic generator which is relatively quiet, generates less dust than metal pulleys and wears well.

SUMMARY OF THE INVENTION

According to the invention there is provided, for use in an electrostatic generator of the kind in which an electrode is charged to a high potential by the transfer thereto of electrical charges by an endless charge conveyor or belt, an electrically conductive pulley for the conveyor, the pulley comprising a metal hub portion and a rim portion, the rim portion having a conveyor-engaging surface at least in part formed by the edges of laminations of electrically conductive fibrous material integrated into a coherent body by a cured impregnant.

The laminations, which are preferably of carbon fibre cloth, lie in the rim portion in the plane of the pulley, that is in planes normal to the pulley axis, so as to present their edges as friction surfaces engaging the conveyor. Advantageously the laminations are incorporated into a coherent body by means of polyurethane with which the carbon fibre cloth is impregnated prior to pressing is cured under the action of a hot mounding process. The volume proportions of the polyurethane in the moulded article varies. In the interior of the coherent body the ratio of fibrous material polyurethane is substantially 70:30 whilst in exterior wearing portion it is about 50:50. This kind of volumetric distribution gives a yieldable surface and enhances the electrical conductivity and resistance to wear of the body. Urethane falls within the class of substances generically designated "curable plastics impregnants" which class also includes plastics materials whose composition is such that its characteristics and suitability for working in the kinds of atmospheres employed in electrostatic generators eg (the gases) $SF_6$, $CCL_3F_2$ or $CCL_4$. Other substances falling within this definition of curable impregnants or bonding material are neoprene, nitril-rubber, butyl-rubber, their copolymers and natural-rubber. In a preferred construction the rim portion including the laminations is attached to a flange extending from the midplane of the hub portion and two such coherent bodies are secured, one on either side of this flange by means of rivets or other fixing means which penetrate both bodies and the flange. The two bodies are preferably preformed with a tapered outer periphery so that a pair co-operates to form a V-shaped groove, the flanks of which define the wearing surface of the pulley of a size suitable to receive the conveyor.

DESCRIPTION OF THE DRAWINGS

In order that the invention may be better understood an electrically conducting pulley embodying the invention will now be described together with its mode of use with reference to the accompanying drawings in which.

DESCRIPTION OF THE PREFERRED EMBODIMENTS

Figure 1:
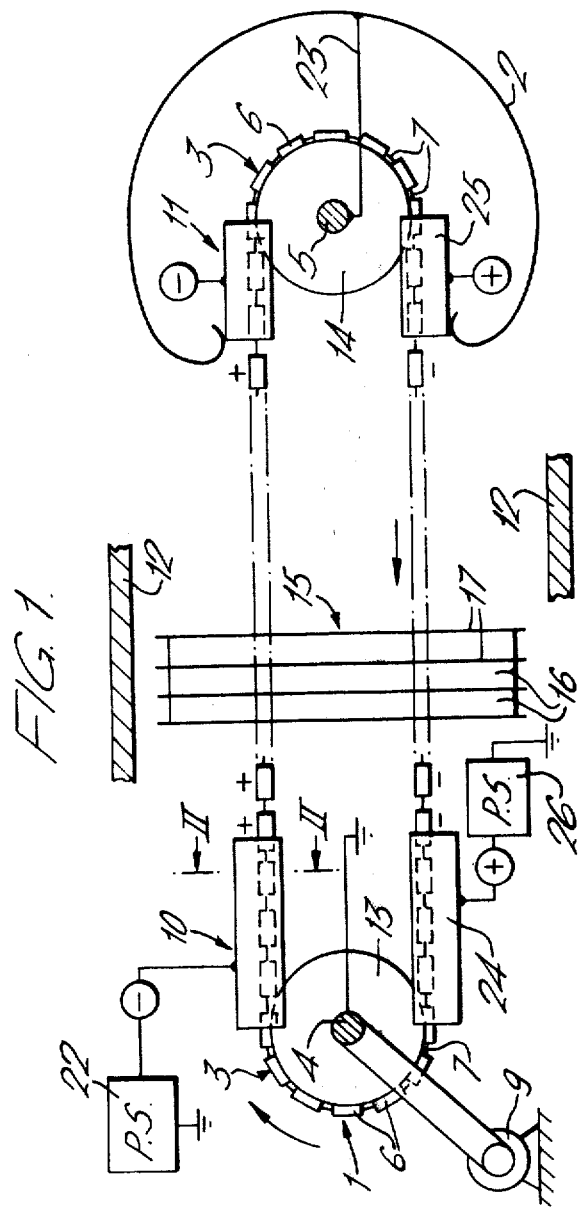
FIG. 1 is a diagrammatic drawing showing the main parts of an electrostatic generator employing pulleys of the invention.

Referring firstly to FIG. 1 there is shown a high voltage electrostatic generator of the kind to which the invention relates. It is to be understood that the invention is concerned with the construction of pulleys employed in the generator and although it is necessary to describe the generator in the following description to demonstrate the construction and merits of the pulley, no generic claim is made to the generator itself.

In FIG. 1, the high voltage electrostatic generator 1 comprises a high voltage terminal 2 and an endless charge conveyor 3 with its bights rotatable about common axes provided by shafts 4, 5. The conveyor is found by a plurality of electrically conductive pellets 6 insulated from each other by nylon links 7. An electrical drive unit 9 drives the conveyor through one pulley 13. An induction charging means for depositing charges on the pellets 6 is indicated at 10 and a discharging means is shown at 11, the latter being for transfer of charge from the pellets.

In further detail, the generator 1 is housed in a pressure vessel 12 filled with high density insulating gas. The pellets 6 are of stainless steel. The conveyor 3 is supported by, and run between, grooved electroconductive pulleys 13, 14. The electrical drive unit 9 rotates both pulleys, the pulley 14 being an idler.

A power supply 22 is used to apply a negative voltage to the charging means 10, the pulley 13 being electroconductive and constructed in accordance with the invention as described below is earthed. The pellets 6 receive positive charges by induction as they leave the pulley 13 and pass the charging means. The conveyor passes through apertures in a stack of glass insulator plates 16 sandwiched between metal shielding plated 17, the stack serving to support the terminal 2 within, and insulated, from the pressure vessel 12.

The conveyor carries the pellets into the negatively changed discharging means 11 near pulley 14 where they give up their charges which pass to the high voltage terminal 2 by way of the electrically conductive pulley 14 and conductor 23. As the pellets 6 leave the pulley 14 so negative charges are bound on them by means of the electrode 25 and they then pass to electrode 24 where a positive voltage binds the negative charges on the pellets 6 until they engage pulley 13. The pellets 6 then pass around the pulley 13 to be recharged and the above described cycle repeated. In those modified versions of conveyor in which a double conveyor is used, such as that in the Laddertron U.S.

Pat. application Ser. No. 446,955 of 28 Feb. 1974 two pulleys at the driving end are both driven whilst the idlers at the other end are allowed to rotate differentially to accommodate for slight differences in the two halfs of the double conveyor. The idler pulleys may be mounted on a shaft, one being fast on the shaft and rotating with it whilst the other idler may be loosely mounted on another region of the same shaft.

EXAMPLE 1

Figure 2:
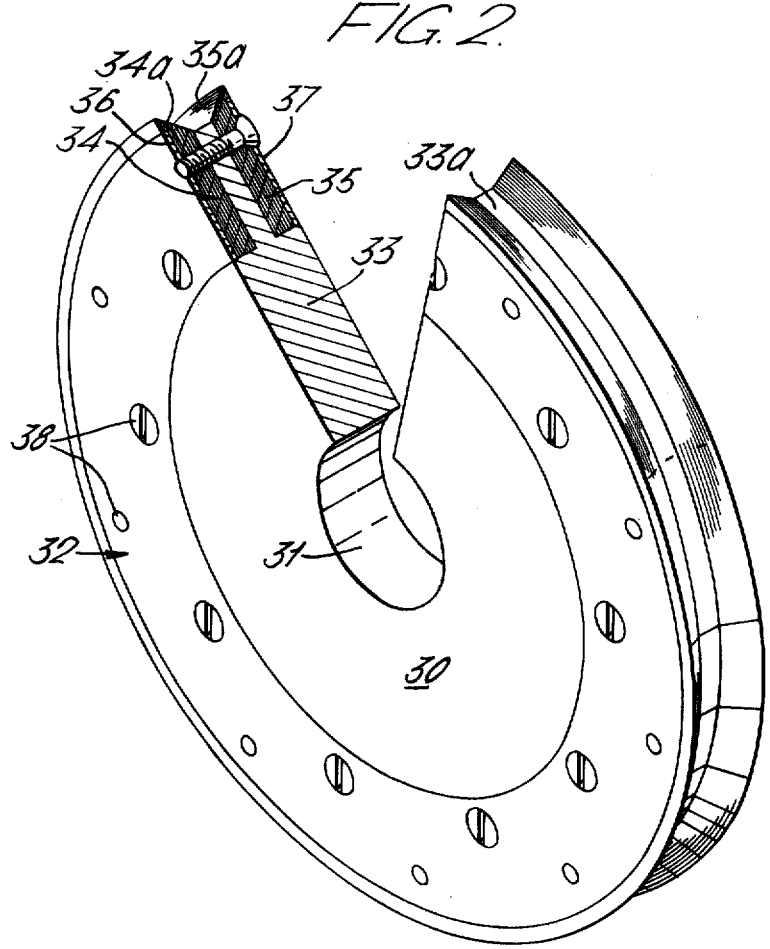
FIG. 2 is an isometric view of one such pulley with a sector cut away to show its construction and FIG. 3 is an enlarged scrap view in radial cross-section of an alternative construction of pulley and showing in dotted outline an axial cross-section through one of the conveyor or pellets.

It will be appreciated that the pulleys 13, 14 not only serve to support and transmit drive to the conveyor but also serve as electrical conductors between the conveyor pellets and their respective pulley shafts. Each pulley is of similar construction being about 12 inches in diameter. Each has an aluminium hub portion 30 with a central bore 31 (FIG. 2) and a rim portion 32, the hub portion 30 has a peripheral parallel sided flange 33 centrally disposed on its periphery and having an outwardly directed face 33a. On each parallel side of the flange 33 is clamped one of the two coherent bodies 34, 35 which are substantially coextensive with the flange 33 but whose edge portions 34a, 35a extend beyond the face 33a where they co-operate to form the cheeks of a V-shaped groove. The edge portions thus act as friction surfaces for the conveyor pellets, the base of the groove being defined by the outwardly directed face 33a of the flange 33. The clamping is effected by aluminium side plates 36, 37 which secure the bodies to the flange 31 by screws 38.

The coherent bodies are made of laminations of sheets of carbon fibre cloth of annular disc-like shape integrated by cured polyurethane. These laminations may be impregnated and cured individually prior to assembly or may be impregnated and cured after assembly. After assembly whichever method is used instead of using sheets of graded diameters, the V-shaped groove can be machined in the periphery of uniformally sized sheets to form the tapered edges 34a, 35a.

Each coherent body may be manufactured in the following manner. A female mould half is first constructed. The mould half comprises a square base plate and four low walls extending along the edges of the base plate. All gaps are left at the ends of the walls to allow drainage from the female half mould. One wall is readily removable by being secured with Allen screws. A male mould half is then constructed. This comprises a square lid of a size to sit on the walls of the female half. Symmetrically and demountably secured to the underside of the lid is a square stiffening plate of a size to fit closely inside the walls of the female half. Clamping bolts are provided which extend through the lid so as to engage with threads in the upper edges of the walls of the female half.

A small quantity of "Flexane 95" urethane is poured into the female half mould to cover the bottom of it. Flexane 95 is a urethane monomer from Devcon Ltd. U.K. which mixed with a hardening agent cures at room temperature to a Shore Hardness of 95. Some of the same urethane is next poured onto a flat metal plate and a piece of electrically conducting fibrous material in the form of graphite cloth, cut to the required size, i.e., 12 inches dia circular, is kneaded into the urethane on the metal plate, turned over and then kneaded into the urethane again, so thoroughly saturating the cloth with the urethane. The urethane-impregnated cloth is now placed into the female half mould.

The process is repeated with the required number of pieces of graphite cloth, adding a small quantity of urethane to the mould every 3rd or 4th layer. The process is such that the volumetric ratio of graphite cloth to urethane varies from substantially 80:20 respectively in the body of the material to substantially 50:50 at the exterior thereof, i.e., the wearing surfaces. The lid with the stiffening plate attached is then placed in position and the clamping bolts inserted. The mould is then placed under a press; pressure is applied by the press and the clamping bolts until the laminate within the mould is compressed to the thickness determined by the distance between the stiffening plate of the male half mould and the base of the female half mould. Finally, the mould is left for 18 to 24 hours under pressure before demoulding.

The stiffening plate is demountably attached to the lid of the mould by screws in such a manner that the plate can be released from the lid before demoulding.

EXAMPLE II

Figure 3:
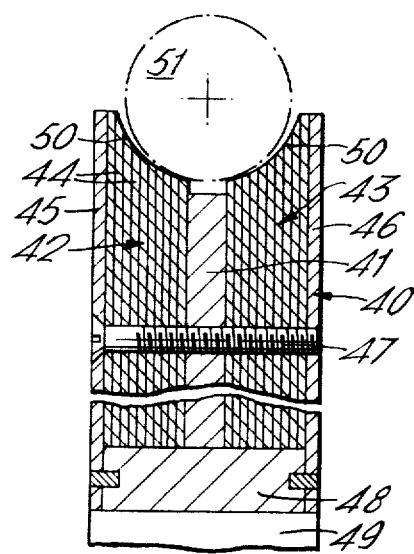

In the alternative construction shown in FIG. 3 the pulley 40 is of split construction and comprises a centre annular disc of cured neoprene 41 flanked by laminated coherent bodies 42, 43. Each body 42, 43 is made up of annular sheets 44 of neoprene between at least some of which are layers 45 of carbon fibre cloth, these laminations being integrated into a coherent bodies by curable impregnant which is applied to the carbon fibre cloth as adhesive. However the impregnated carbon fibre cloth is treated to allow the impregnant to cure before assembly so that it is dry to handle. The laminations are then assembled with adhesive. The coherent bodies are clamped on to the neoprene disc 41 between flanking metal plates 46 by screws 47. The plates 46 are also fixed to a hub position 48 having a central bore 49. The outer peripheral edges of the assembled pulley is machined to give an arcuate profile 50 as shown. The radius of profile 50 matches the radius of a typical cylindrical pellet 51 shown in dotted outline. Either of the two examples may be modified by substituing for some of the laminations be they carbon fibre or neoprene, layers of suitable "filler" fabric such as canvas. Alternatively or additionally a pulley with a peripheral V-shaped groove may have only one of the two coherent bodies electrically conducting by omitting the carbon or other electrically conducting fibre.

Graphite fibre cloth may be used in places where carbon fibre cloth has been mentioned in its stead.

The electrical resistance between the metal pellet passing over the pullet and the pulley shaft is found to be 100 ohms or less according to the value several parameters, homogeneity, contact area etc.

Alternative suitable cured impregnants which may be used in place of polyurethane are those in the group comprising neoprene, butyl rubber nitrile rubbers and natural rubber. The term 'cured' as used herein means improved by chemical alteration, as by vulcanising in the case of natural rubber, or treated with heat or chemically in the case of plastics, to make firm.

I claim:

1. For use in an electrostatic generator of the kind in which an electrode is charged to a high electrical potential by the transfer of electrical charges there to by an endless charge conveyor, an electrically conductive pulley for the charge conveyor, the pulley comprising a metal hub portion and a rim portion, the rim portion having a conveyor-engaging surface at least in part formed by the edges of laminations of sheets of electrically conductive fibres integrated into a coherent body by a cured impregnant.

2. For use in an electrostatic generator, an electrically conductive pulley as claimed in claim 1 in which the laminations are composed of carbonaceous fibres integrated into a coherent body by a cured plastics impregnant.

3. For use in an electrostatic generator, an electrically conductive pulley as claimed in claim 1 in which the rim portion is a composite structure composed of two coherent bodies made of laminations of carbon fibre cloth integrated by a curable impregnant, the laminations lying in planes normal to the pulley axis, the hub portion having a flange to which the coherent bodies are secured.

4. For use in an electrostatic generator, an electrically conducting pulley as claimed in claim 3, having a rim portion whose outer periphery defines a V-shaped groove created by co-operating tapered edges to two coherent bodies.

5. For use in an electrostatic generator, an electrically conductive pulley as claimed in claim 3 in which the two coherent bodies are each flanked by a plate of electrically conductive metal and securing means are provided securing the said plates and the coherent bodies to the flange of the hub portion.

6. For use in an electrostatic generator an electrically conductive pulley as claimed in claim 1 in which the cured impregnant plastics material is selected from the group Neoprene, polyurethane, butadiene/acrylonitrile copolymer, butyl rubber, natural rubber.

7. For use in an electrostatic generator, an electrically conductive pulley as claimed in claim 5 in which each coherent body is shaped as an annular block having a central bore to receive said hub portion parallel sides and a peripheral surface oblique to said sides, the hub portion having a peripheral flange centrally disposed and having an outwardly directed face, and annular metal side plates clamping the two bodies to the flange, with said peripheral surfaces oblique to said sides of the bodies co-operating to form the cheeks of a V-shaped groove as friction surfaces for the conveyor the base of which groove being defined by the outwardly directed face of the flange.

8. For use in an electrostatic generator, an electrically conducting pulley as claimed in claim 1 in which the volumetric ratio of fibrous material to cured impregnant lies between about 80:20 in the body of the fibrous material and about 50:50 in the outer regions of the coherent body.

9. For use in with an electrical charge conveyor of an electrostatic generator, an electrically conducting pulley having conveyor-engaging surfaces comprised by the edge portions of laminations, the laminations being flexible sheets disposed in the plane of the pulley so lying in planes normal to the pulley axis at least a number of the flexible sheets containing carbonaceous fibres and others being of a filler material, the laminations being integrated into a unitary body by a cured bonding material.

* * * * *